May 5, 1942. G. C. BABCOCK 2,281,908
BOX
Filed May 8, 1937 2 Sheets-Sheet 1

INVENTOR.
Guilford C. Babcock.
BY
Blair, Curtis, Dunne & Hayward
ATTORNEYS.

May 5, 1942. G. C. BABCOCK 2,281,908
BOX
Filed May 8, 1937 2 Sheets-Sheet 2
Fig. 7.
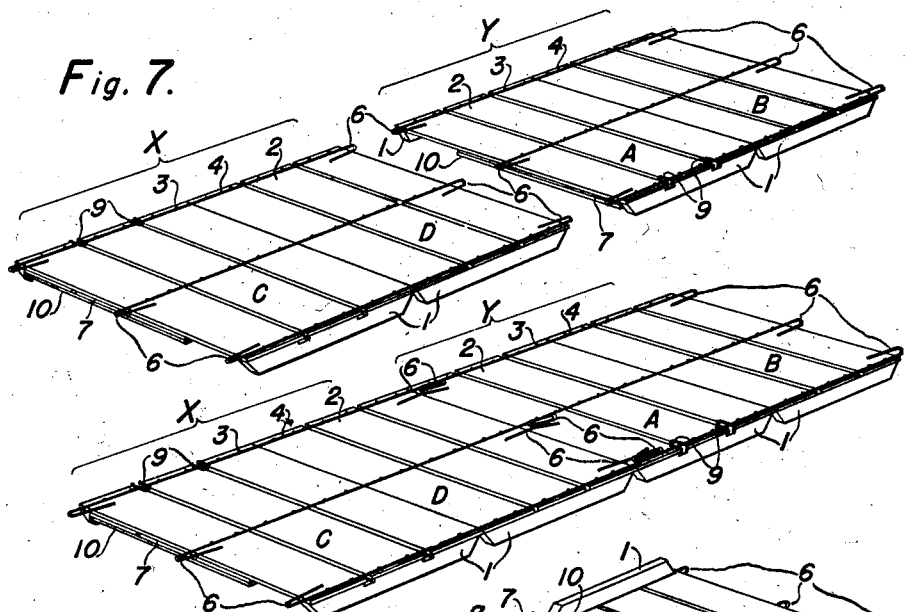
Fig. 8.
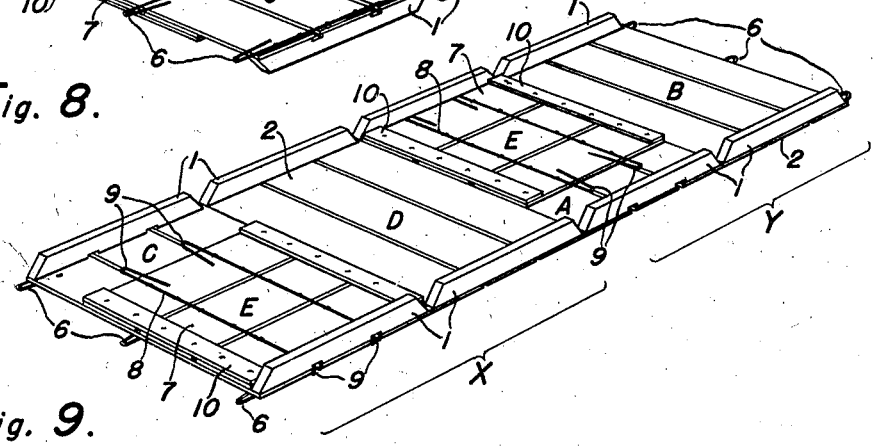
Fig. 9.
Fig. 10.
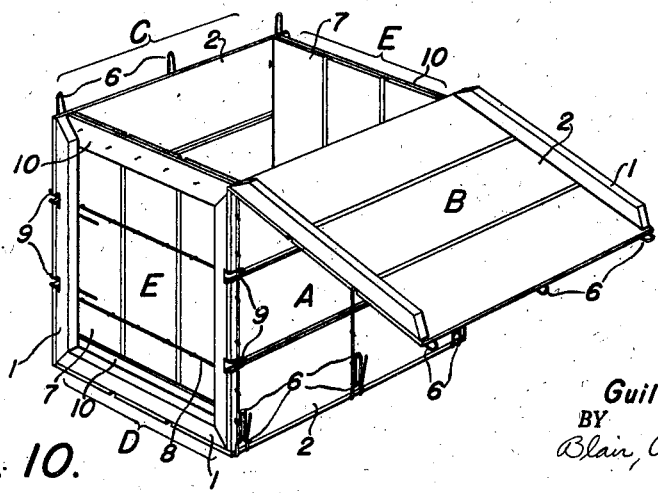
INVENTOR.
Guilford C. Babcock.
BY
Blair, Curtis, Dunner & Hayward
ATTORNEYS.

Patented May 5, 1942

2,281,908

UNITED STATES PATENT OFFICE 2,281,908

BOX

Guilford C. Babcock, Morris Township, Morris County, N. J., assignor to Stapling Machines Co., a corporation of Delaware Application May 8, 1937, Serial No. 141,403

7 Claims. (Cl. 217—47)

This invention relates to boxes and methods of making and packing the same and particularly to wirebound boxes for fruits and vegetables and methods of making and packing the same.

It is an object of the invention to provide a dependable and economical container for the shipment of fruits, vegetables and other commodities which are "face packed" in the box.

It is a further object of the invention to provide a wirebound box which may be "face packed" without employing a form or other device to assist in face packing the box.

It is a further object to provide a box which permits inserting the contents from the bottom of the box and removing the contents from the top of the box.

It is a further object to provide a box which may be opened for inspection either from the top or the bottom and readily reclosed after inspection.

It is a further object of the invention to provide a method of making a wirebound box having the characteristics hereinbefore specified.

It is a further object of the invention to provide an improved method of face packing fruits and vegetables in a box.

Other objects will be in part obvious and in part pointed out hereinafter.

In the drawings:

Fig. 7 is a perspective view of the two units of the blank which when assembled and folded constitute the front, bottom, rear and top of the box shown in Figs. 1 to 3.

Fig. 8 is a perspective view of the box blank after the two units shown in Fig. 7 have been connected together.

Fig. 9 is a perspective view of the under side of the blank shown in Fig. 8 and illustrating the manner in which the end sections of the box are incorporated in the flat with the front, bottom, rear and top sections of the box.

Fig. 10 is a perspective view of the box shown in Figs. 1 to 3 resting on its top section and with its bottom section thrown back to permit packing the box through the bottom.

As conducive to a better understanding of the invention it may be noted that certain commodities such for example as fruits and vegetables are frequently "face packed" to improve and make more attractive the appearance of the commodity when the cover of the box is raised or removed. A "face pack," as its name implies, means that the top or "face" layer of the commodity in the box is hand placed at the same level to produce a smooth even face.

Heretofore boxes have been "face packed" by using a form or open top container of substantially the same shape as the box but slightly smaller in size to permit the form to fit into the box. The commodity was "face packed" on the bottom of the form and then after the form was filled with the commodity the box was placed over the form with the bottom of the box resting upon the open top of the form. The box and the form were then inverted and the form withdrawn from the box leaving the commodity face packed at the top of the box.

The present invention is intended to eliminate the use of the form hereinbefore referred to or any other separate appliance or device for producing a face pack. This is accomplished by providing a box which may be packed through the bottom, thus placing the face pack at the top of the box and by providing a top and bottom either or both of which may be readily opened and closed repeatedly.

Figure 1:
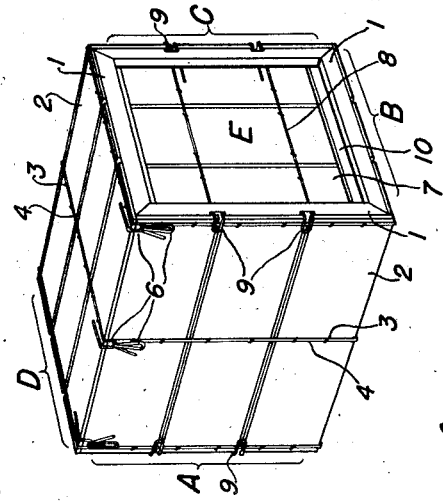
Figure 1 is a perspective view of a wirebound box embodying the invention.

Referring to Fig. 1, the box consists of a front section A, a bottom section B, a rear section C, a top section D, and end sections E.

The front, bottom, rear and top sections each consist of end cleats 1, preferably of resawed lumber, and slats 2 of side material such for example as rotary cut veneer or resawed lumber. The cleats 1 and slats 2 are secured together by staples 3 which also secure flexible binders (preferably wires) 4 to the sections.

Referring to Fig. 7, the sections A, B, C and D preferably are made in the flat and in two units designated respectively X and Y. Unit Y consists of front section A and bottom section B connected together by flexible binders 4. Unit X consists of rear section C and top section D connected together by flexible binders 4. Each end of each binder of each unit is bent to form a loop or bight 6 which may be perpetuated by driving the end of the binder into a slat 2. The loops or bights 6 are adapted to interengage with similar loops or bights on an adjacent box part by passing one loop or bight through another loop or bight and bending the first loop or bight back against the box part. Such an interengagement is shown in Fig. 8 where the two units X and Y have been connected together by interengagement of adjacent bights or loops 6.

As shown in Figs. 7 and 8, the sections A, B, C and D are so arranged that when unit X and unit Y are connected together as shown in Fig. 8, top section D will be connected to rear section C and front section A, while bottom section B and rear section C will be separated by front section A and top section D. Thus when the flat blank shown in Fig. 8 is folded into box form the bottom section B may be swung back as shown in Fig. 10 to permit filling the box through the bottom and face packing a layer of fruit on the under side of the top section D.

The end sections E of the box preferably consist of slats 7 of rotary cut veneer or resawed lumber having wires 8 stapled thereto and provided at either end with loops or bights 9 to connect the end sections E to the front and rear sections A and C, as shown in Figs. 1 to 6. The ends E may be provided with reenforcing battens 10 stapled or otherwise secured to the slats 7.

As shown in Fig. 9, when the blank is in the flat each end section E is connected at one side only to a blank section and when the blank is folded into box form the other side of each end section is connected to another blank section.

When the box as shown in Fig. 10 has been face packed and filled with the commodity to be shipped therein, the bottom section B is swung into closing position and the loops or bights 6 on the bottom section B are interengaged with the loops or bights 6 on the rear section C to close the box.

During transit the box may be opened for inspection either by releasing the top fasteners 6 and raising the top section D or by inverting the box, releasing the bottom fasteners 6 and raising the bottom section B.

At destination when the top section D is raised the face packed fruit is at the top of the box.

The box construction just described has many advantages. In addition to permitting a face pack without the use of any form or other appliance the commodity in the box may be inspected repeatedly through the bottom of the box without disturbing the face pack at the top of the box. The construction also permits what is commonly referred to as "plugging" without disturbing the face pack. In storage and transit some of the pieces of fruit or some of the vegetables in the box may be damaged or may become decayed. These damaged or decayed pieces may be removed and other non-defective pieces substituted. This is what is called "plugging." In applicant's construction this plugging may be done through the bottom of the box and without disturbing the face pack at the top of the box.

Figure 3:
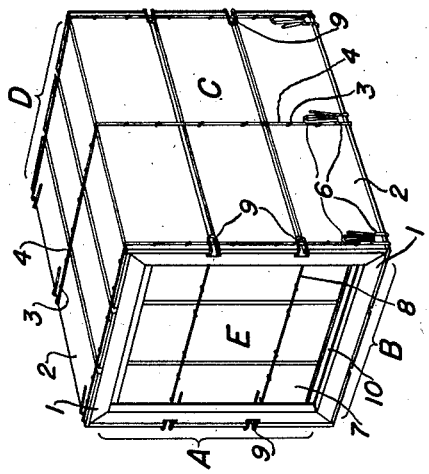
Fig. 3 is a perspective view of the other side of the box.
Figure 6:
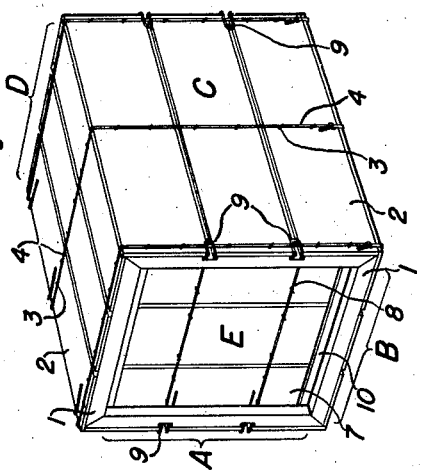
Fig. 6 is a perspective view of the other side of the modified form of box shown in Fig. 4.
Figure 2:
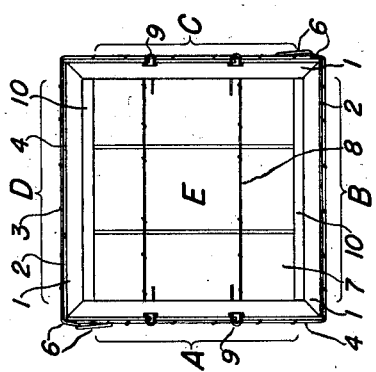
Fig. 2 is an end view of the same.
Figure 5:
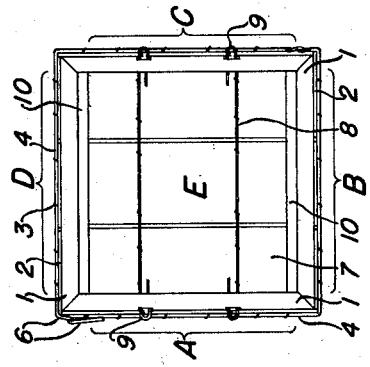
Fig. 5 is an end view of the same.
Figure 4:
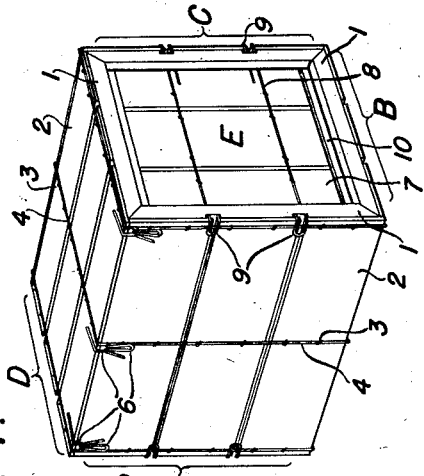
Fig. 4 is a perspective view of a modified form of box embodying the invention.

A modification is shown in Figs. 4, 5 and 6. The box shown in these figures is the same as the box heretofore described except that the flexible binders on the rear and bottom sections are twisted together as shown in Figs. 5 and 6 instead of being connected with the interengageable fasteners 6 shown in Figs. 2 and 3. This modified construction may be used to advantage with commodities which do not require inspection. The face pack is produced in the same way, i. e., by packing through the bottom of the box and then when the box is filled the bottom is permanently secured in place by intertwisting the wire ends. It may be opened as in the other construction by releasing the interengageable fasteners 6 at the top of the box.

As used in the specification and claims the word "box" is intended to cover both boxes and crates.

It will be understood that the invention is not to be limited to the specific embodiment shown for purposes of illustration as the inventive features may be variously embodied without departing from the invention.

It will also be understood that all of the inventive features need not be used conjointly as they may be used separately or in various combinations as defined in the subjoined claims.

I claim:

1. A box comprising front, bottom, rear and top sections foldably connected together with flexible binders secured thereto, end sections secured to the front and rear sections and free of attachment to the top and bottom sections, the flexible binders at the front top corner edge of the box and at the rear bottom corner edge of the box being provided with interengageable fasteners whereby either the top fasteners or the bottom fasteners may be manipulated to open and close the box.

2. A box comprising front, bottom, rear and top sections foldably connected together with flexible binders secured thereto, end sections secured to the front and rear sections and free of attachment to the top and bottom sections, the flexible binders at a top corner edge of the box and at a bottom corner edge of the box being provided with interengageable fasteners whereby either the top fasteners or the bottom fasteners may be manipulated to open and close the box.

3. A box comprising a plurality of sections connected together with flexible binders secured thereto, the flexible binders at a top corner edge of the box and at a bottom corner edge of the box being provided with interengageable fasteners whereby either the top fasteners or the bottom fasteners may be manipulated to open and close the box.

4. A box comprising front, bottom, rear, top and end sections, the top section being hingedly connected to the rear section and releasably connected to the front section, the bottom section being hingedly connected to the front section and releasably connected to the rear section, and the end sections being connected to the front and rear sections but free of attachment to the top and bottom sections whereby the box may be opened and closed at the top or at the bottom.

5. A box comprising front, bottom, rear and top sections, the top section being hingedly connected to the rear section and releasably connected to the front section, and the bottom section being hingedly connected to the front section and releasably connected to the rear section whereby the box may be opened and closed at the top or at the bottom.

6. A box blank comprising four sections of side material and cleats foldably connected with flexible binders secured thereto, the flexible binders between two of the sections being connected together with releasable fasteners and the flexible binders at each end of the blank being provided with releasable fasteners to engage with each other when the blank is folded into box form whereby the box may be opened by releasing either set of releasable fasteners.

7. A box blank comprising a plurality of sections of side material and cleats foldably connected with flexible binders secured thereto, the flexible binders between two of the sections being connected together with releasable fasteners and the flexible binders at each end of the blank being provided with releasable fasteners to engage with each other when the blank is folded into box form whereby the box may be opened by releasing either set of releasable fasteners.

GUILFORD C. BABCOCK.